United States Patent Office 3,469,983

Patented Sept. 30, 1969

3,469,983

PREPARATION OF PHOTOPOLYMER LITHOGRAPHIC OFFSET PAPER PLATES

Carl E. Diener and William G. Herrick, Binghamton, N.Y., assignors to GAF Corporation, New York, N.Y., a corporation of Delaware No Drawing. Filed July 6, 1965, Ser. No. 469,922

Int. Cl. G03c *1/86*; B41m *3/00*

U.S. Cl. 96—75 10 Claims

ABSTRACT OF THE DISCLOSURE

Lithographic plate having a paper base, an anchoring layer thereon of heat-cured hydroxyethyl cellulose, and an overlying light-sensitive layer of a lipophilic resin containing a polymerizable ethylenically unsaturated monomer and a radiation-sensitive ferric salt as a polymerization catalyst.

The present invention relates to photopolymer paper offset printing plates, based on the ferric salt-peroxide polymerization system, and particularly to such plates in which the lipophilic photopolymer images are tightly anchored to the paper base.

It is known that radiation-sensitive ferric salts when exposed to light are reduced to ferrous ions which in the presence of peroxide produce free hydroxyl radicals capable of initiating polymerization (see U.S.P. 3,101,270 granted Aug. 20, 1963). When such a ferric salt, together with an ethylenically unsaturated monomer, containing at least one $CH_2=C<$ group, and a lipophilic resinous binder is coated on a suitable paper support, exposed to light and contacted with an aqueous peroxide, photopolymer images form in the exposed area. By washing away the unexposed areas, images remain which are ink-repective. The areas from which the unexposed material has been removed are hydrophilic. The coating may thus be used as a negative-working lithographic paper offset printing plate.

A lithographic plate utilizing these principles may be presensitized or may be sensitized shortly before use. The sensitivity of such a plate is such that it may be handled in room light for short periods and the only processing needed is the application of a dilute aqueous peroxide solution coupled with a light sponging with water to removed unexposed areas. The shelf life of the presensitized plate is at least six months and the cost of production is quite low.

As a matter of fact the economics of such a paper plate highly recommend its adoption, particularly for producing small or moderate press runs. Unfortunately, however, such a plate has certain inherent characteristics which have mitigated against its commercialization. These stem from a certain antipathy of the polymer image areas to adhere to the paper surface as a result of which the image surface is often displaced from the base during processing or during press runs. Furthermore, the lipophilic ingredient in the sensitive coating has a tendency to strike into and be retained by the paper base even during and after processing. This precludes a sharp line of demarcation between the lipophilic (greasy ink-receptive) and hydrophilic (water-receptive) areas.

We have now discovered that the photopolymer image may be very firmly anchored to the paper base while avoiding permeation of the base by the lipophilic carrier by coating the base with a layer of a water-soluble hydroxyethyl cellulose and curing or hardening the hydroxyethyl ether at slightly elevated temperatures. Paper plates in which the paper base is coated with a layer of hardened hydroxyethyl cellulose and sensitized with a polymerizable monomer, a lipophilic resin carrier and a radiation-sensitive ferric compound and the processing of such a plate constitute the purposes and objects of our invention.

Any suitable strong paper, such as 100% rag or the like, may be used for the base. Before laying down the sensitizing composition on such base a surface of the paper is coated with a layer of hydroxyethyl cellulose and the layer then hardens. To this end the paper is coated with a dilute aqueous solution of the cellulose ether, say a 1 to 2% solution. To this solution should be added a small amount of an acid-hardening or curing agent, preferably maleic anhydride, although other acid anhydrides, such as succinic, phthalic, or the like may also be used. The curing agent will usually be present in an amount of from .3 to .6 part by weight and the ether from 1 to 2 parts by weight. Preferably a spreading agent such as saponin, lauryl sulfonate, keryl benzene sulfonate or the like is employed.

After coating the hydroxyethyl cellulose layer, it is allowed to dry. The coating is then cured or hardened in an oven for a few minutes, about 3 to 6 minutes, at a temperature of about 100° C.

The hydroxyethyl cellulose which we prefer to use is that sold by Hercules Powder Company as Natrosol 260-L. It is a non-ionic, water-soluble cellulose etherified with hydroxyethyl groups. It is sold as a white granular powder soluble in either cold or hot water.

The presence of the hardened hydroxyethyl cellulose in the photo-polymer plate endows the plate with many favorable properties. Thus it ensures excellent adhesion between the image areas and the paper base so that the unexposed areas may be washed away without damage to the plate. Said layer also acts as a barrier to the lipophilic resin carrier or binder minimizing its absorption by the paper base. No displacement of the image areas with respect to the surface of the base ensures during press runs. The hydroxyethyl cellulose layer even though hardened remains hydrophilic and provides non-printing portions where the unexposed areas are removed.

The light-sensitive overcoat is applied directly over the heat treated hydroxyethyl cellulose undercoat. The essential components of the light-sensitive layer are the resin binder which should be capable of laying down a film exhibiting lipophilic properties, the ethylenically unsaturated monomer and the radiation-sensitive ferric salt.

The lipophilic resin binder may be any lipophilic polyvinyl compound which is capable of producing a lipophilic film when laid down from an aqueous emulsion or dispersion. Suitable resins are polystyrene, polymethylmethacrylate, copolymers of vinyl chloride and acrylic acid, vinylidene chloride and vinyl acetate, vinyl acetate and crotonic acid, methylacrylate and methylmethacrylate and similar materials.

Particularly valuable emulsions for our purpose are the vinyl acetate copolymers and terpolymers sold by National Starch and Chemical Corporation as Resyns 78-3113, 25-2203, 16-4601, 25-2200, 25-1411 and 25-1234. The average solid content of these emulsions is about 45 to 50%, average grain size about .1 micron and average viscosity about 650 cps.

Of these polymers, Resyns 78-3113, 25-2203, 16-4601 and 25-1411 are the copolymers of vinyl acetate and unsaturated acids, which contain at least one free carboxy group, such as crotonic acid, maleic acid, acrylic acid, methacrylic acid, itaconic acid and fumari acid. Resyns 25-2200 and 25-1234 are terpolymers prepared by reating the above-described copolymers with an internal plasticizer. The latter compounds can be described as "chain spacers" which give to the terpolymers more flexibility, softness, higher elongation and lower second order transition temperatures (brittle points). The monomers which serve as these internal plasticizers can be described as acrylic and methacrylic esters with relatively long side chains of from 2 to 3 carbon atoms. Suitable illustrations are ethyl, butyl or 2-ethyl hexyl acrylate, ethyl, butyl or 2-ethyl hexyl maleic and fumaric esters as illustrated by dibutyl maleate or di(2-ethyl hexyl) fumarate.

The resins are emulsified in a starch or dextrose solution. If desired, other water-soluble colloids preventing agglomeration of the polymer particles may be used, such as polyvinyl alcohol, methyl cellulose, sodium polyacrylate and the like. Preferably, the pH of the emulsion should not exceed 6.0.

More specifically, Resyn 25–2200 in the form of the latex emulsion contains 46% solids with the average particle size being .1 micron. Resyn 25–1234 in the form of the emulsion contains 51% solids with the average particle size being .3 micron. Both Resyns give clear lipophilic films upon drying.

To an aqueous dispersion or emulsion of the lipophilic resin, or mixtures thereof, there is added the ethylenically unsaturated monomer such as acrylamide, methacrylamide, N-ethanol acrylamide, acrylonitrile, methacrylic acid, acrylic acid, vinyl acetate, vinyl benzoate, vinylpyrrolidone, vinyl methyl ether, or the like.

We find, however, that best results are secured if the ethylenically unsaturated monomer is one usually employed as a cross-linking agent and which has at least two terminal vinyl groups linked to a carbon atom in a straight chain or in a ring. Examples of such compounds are N,N′-methylene-bis-acrylamide, triallyl cyanurate, divinyl benzene, divinyl ketone and diglycol diacrylate. These agents serve to form a cross-linked network which holds the lipophilic resins together.

The radiation-sensitive ferric salt may be any of the light-sensitive ferric salts described in U.S.P. 3,101,270. Thus use may be made of ferric acetate, ferric ammonium citrate, ferric ammonium tartrate, ferric bromide, or the like. We prefer, however, a ferric ammonium salt such as ferric ammonium citrate.

The light-sensitive coating may also contain other ingredients designed to improve the coating or to expedite its processing. To this end the coating may contain a sugar, such as maltose or dextrose, to increase the sensitivity of the coating.

A pigment is generally used to improve image visibility during processing. Any pigment is suitable and we may thus use Nigrosine, Oil Blue C (Color Index, volume 2, 2nd edition, page 7829), Oil Red (Color Index, volume 2, 2nd edition, page 2844), or Oil Yellow (Color Index, volume 2, 2nd edition, page 2818).

Usually the pigment is dispersed in a wetting agent and for this purpose any of the wetting agents previously mentioned may be employed. We prefer, however, to use N-long chain alkyl-β-alanines, such as are described in U.S.P. 2,468,012 dated Apr. 19, 1949 and particularly the partial sodium salt of N-lauryl-β-dipropionate (Der.). The wetting agent serves primarily to disperse the components in the composition and to improve spreading. However, it also aids in the washout operation in removing the unpolymerized areas.

It has been noted that the resin binders have a tendency to set somewhat on standing. For best results, however, the sensitizing composition should be in a soft, readily washable state. It has been ascertained that the addition of a small amount of PVP will ensure that this be achieved.

Experimentation has established, and this is a further important finding on our part, that the photopolymerization paper offset printing plate exhibits most favorable properties when small amounts of the hydroxyethyl cellulose and maleic anhydride are added to the light-sensitive coating. The addition of these constituents has been found to increase the homogeneity of the light-sensitive overcoat and the hydroxyethyl cellulose precoat at their interface thus leading to a further improvement in the adhesion of the image areas to the paper support.

A plate constituted as indicated is quite simply processed. Thus it is exposed underneath a pattern to a source of white light for a few minutes and then dipped into a dilute aqueous solution of a peroxide. The unexposed areas are removed from the plate by swabbing with a soft, wet cellulose sponge. The plate is next rinsed with water and dried, the image areas remaining lipophilic. The plate is now ready for use on the offset press.

The following examples will serve to further illustrate the invention but it is understood the invention is not restricted thereto.

EXAMPLE I

The surface of a paper support is coated with:

| | Cc. |
|---|---|
| Natrosol 250–L 1.5% (aqueous) | 100 |
| Maleic anhydride 8% (aqueous) | 6 |
| Saponin 8% (aqueous) | 2 |

When the coating has dried, it is heat treated (oven) at 100° C., for five minutes, after which it is coated with:

| | | |
|---|---|---|
| Resyn 25–2200 | g. | 15 |
| Resyn 25–1234 | g. | 15 |
| Water | cc. | 50 |
| N,N′-methylenebisacrylamide | g. | 2 |
| Dextrose | g. | 2 |
| Der. 10% (aqueous) | cc. | 4 |
| Red pigment | g. | 0.2 |
| Polyvinylpyrrolidone 7% | cc. | 16 |
| Natrosol 250–L 5% (aqueous) | cc. | 2 |
| Maleic anhydride 8% (aqueous) | cc. | 0.25 |
| Ferric ammonium citrate 36% (aqueous) | cc. | 5 |

After drying in subdued (yellow) light, the plate is exposed through a photographic line or half-tone negative.

Light source: GE 15 watt B1 Light
Distance: 2½ in.
Exposure time: 3 minutes

The exposed plate is dipped into a 1% aqueous hydrogen peroxide solution. The exposed areas are removed from the plate by swabbing with a soft, wet cellulose sponge. After the plate has been rinsed with water (40° C.) and dried, the image areas which remain are lipophilic. The areas from which the sensitized coating has been removed are hydrophilic. The plate is now ready for offset press use and will respond to normal press procedures.

EXAMPLE II

The procedure is the same as in Example I excepting that in lieu of Resyns 25–2200 and 25–1234 there is used an aqueous dispersion of a copolymer of vinyl chloride and vinyl acetate.

EXAMPLE III

The procedure is the same as in Example I excepting that the N,N′-methylene-bis-acrylamide is replaced by divinyl benzene.

Modifications will occur to persons skilled in the art and we therefore do not intend to be limited to the patent granted except as necessitated by the appended claims.

We claim:

1. A paper plate capable of conversion to an offset printing plate comprising a paper base, a layer of hardened or cured hydroxyethyl cellulose on said base and a light-sensitive composition on said layer comprising a binder of a lipophilic polyvinyl resin, an ethylenically unsaturated monomer containing the grouping $CH_2{=}C{<}$ and a radiation-sensitive ferric salt, said layer of hydroxyethyl cellulose acting to bond the images of the offset plate to the paper base and prevent the lipophilic resin from striking into said base.

2. A paper plate as defined in claim 1 wherein the lipophilic resin is a mixture of polyvinyl compounds.

3. A paper plate as defined in claim 1 wherein the ethylenically unsaturated monomer is a cross-linking agent containing at least two terminal vinyl groups.

4. A paper plate as defined in claim 3 wherein the cross-linking agent is N,N'-ethylene-bis-acrylamide.

5. A paper plate as defined in claim 1 wherein the lipophilic resinous binder is prevented from setting by the addition of a small amount of polyvinylpyrrolidone.

6. A paper plate as defined in claim 1 wherein the light-sensitive composition contains a small amount of hydroxyethyl cellulose and maleic anhydride.

7. An offset printiig plate having a paper base, grease-receptive printing portions comprising a lipophilic cross-linked polyvinyl resin anchored to said paper base by a layer of a hardened or cured hydroxyethyl cellulose and hydrophilic non-printing portions.

8. The process of producing a plate capable of conversion to an offset printing plate which comprises coating a paper base with a dilute aqueous solution of hydroxyethyl cellulose containing a small amount of an acid hardening agent, drying said coating and hardening the same by heating to an elevated temperature up to about 100° C., overcoating said hydroxyethyl cellulose coating with an aqueous dispersion of a light-sensitive composition comprising a binder of a lipophilic polyvinyl resin, an ethylenically unsaturated monomer containing a $CH_2{=}C<$ and a radiation-sensitive ferric salt.

9. The process as defined in claim 8 wherein the ethylenically unsaturated monomer is N,N'-ethylene-bis-acrylamide.

10. The process as defined in claim 8 wherein the light-sensitive composition contains a small amount of hydroxyethyl cellulose and maleic anhydride.

References Cited

UNITED STATES PATENTS

| | | | |
|---|---|---|---|
| 2,760,863 | 8/1956 | Planbeck | 96—35.1 |
| 3,061,431 | 10/1962 | Levinos | 96—35.1 |
| 3,099,558 | 7/1963 | Levinos | 96—115 X |
| 3,136,638 | 6/1964 | Schwerin et al. | 96—92 X |
| 3,169,065 | 2/1965 | Sorkin et al. | 96—33 |
| 3,235,382 | 2/1966 | Neugebauer et al. | 96—85 X |
| 3,388,995 | 6/1968 | Schwerin et al. | 96—33 X |

FOREIGN PATENTS

| | | |
|---|---|---|
| 815,471 | 6/1959 | Great Britain. |
| 936,569 | 9/1963 | Great Britain. |
| 950,870 | 2/1964 | Great Britain. |
| 772,112 | 4/1957 | Great Britain. |

NORMAN G. TORCHIN, Primary Examiner

R. E. MARTIN, Assistant Examiner

U.S. Cl. X.R.

96—85, 115; 101—462; 117—34

Disclaimer

3,469,983.—*Carl E. Diener* and *William G. Herrick*, Binghamton, N.Y. PREPARATION OF PHOTOPOLYMER LITHOGRAPHIC OFFSET PAPER PLATES. Patent dated Sept. 30, 1969. Disclaimer filed Sept. 30, 1982, by the assignee, *Eastman Kodak Co.*

Hereby enters this disclaimer to all claims of said patent.

[*Official Gazette March 1, 1983.*]